L. J. ATWOOD.
Lamp Burner.
No. 91,590.
Patented June 22, 1869.
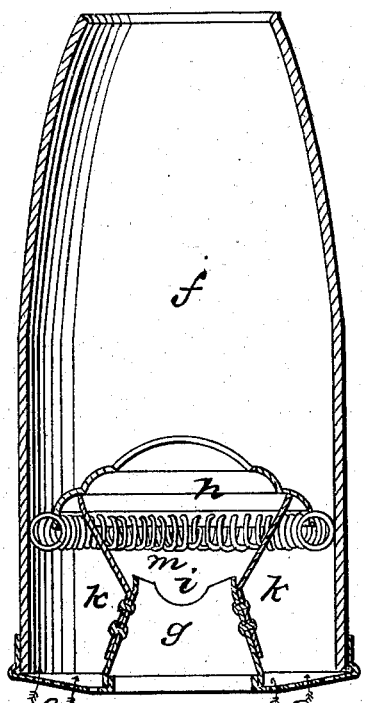
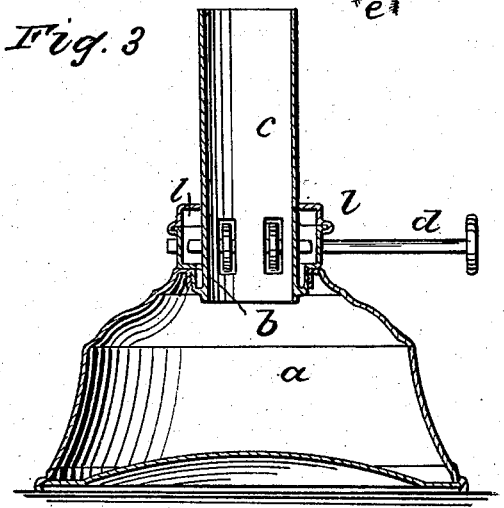
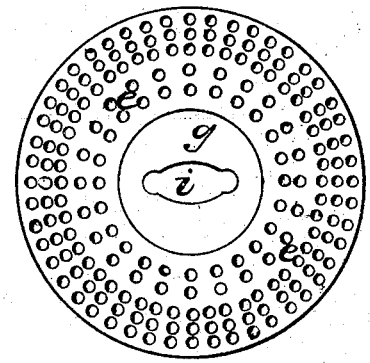
Witnesses
Chas. H. Smith
Geo. D. Walker
Inventor
Lewis J. Atwood
per L. W. Sewell
Atty

United States Patent Office.

LEWIS J. ATWOOD, OF WATERBURY, CONNECTICUT, ASSIGNOR TO HIMSELF AND HOLMES, BOOTH, AND HAYDENS, OF SAME PLACE.

Letters Patent No. 91,590, dated June 22, 1869.

IMPROVEMENT IN LAMPS.

The Schedule referred to in these Letters Patent and making part of the same.

To all whom it may concern:

Be it known that I, LEWIS J. ATWOOD, of Waterbury, in the county of New Haven, and State of Connecticut, have invented, made, and applied to use, a certain new and useful Improvement in Lamps; and I do hereby declare the following to be a full, clear, and exact description of my said invention, reference being had to the annexed drawing, making part of this specification, wherein—

Figure 1 is a vertical section of my said improved lamp, the draught-plate and chimney being shown as raised off the wick-tube and reservoir.

Figure 2 is an inverted plan of the air-distributer and tapering wick-tube guide.

Similar marks of reference denote the same parts.

Heretofore an argand-lamp has been made with a glass chimney, in which a draught-plate was affixed, to direct the air upon the flame.

The glass chimney has also been contracted for a similar purpose.

In Letters Patent granted to me, January 21, 1868, a lamp-burner is shown of the same construction as the present.

The nature of my present invention, therefore, relates to features of claim not secured by the Letters Patent last named; and consists in a perforated air-distributer, sustained around, but removable from the flat-wick tube, in combination with a draught-plate connected with said air-distributer, and passing up into the glass chimney; and in combination with said air-distributer and draught-plate, I employ a close cap, surrounding the lower part of the wick-tube, and forming a support for said air-distributer, as well as an enclosure for the wick-raiser.

In the drawing—

$a$ represents the reservoir for kerosene or other hydrocarbon;

$b$, the screw-cap;

$c$, the wick-tube;

$d$, the wick-raiser; and $l$, the closed cap over the ratchet.

$e$ is the perforated air-distributer, upon the edge of which the chimney $f$ is to rest, and a rim of any desired ornamentation may be turned up, for the said chimney to set within.

In the central part of the air-distributer $e$, is the guide $g$, that has a circular open base to rest upon the cap $l$, and a tapering interior, shaped to set around the wick-tube $c$; and notches, at $i$, allow the air-distributer and other parts to be lifted up off the wick-tube without extinguishing the flame, or replaced thereon, as occasion may require; and, when in place, the upper portion $l$, of the cap $b$, receiving the base of the conical guide $g$, causes the parts to sit firmly upon the lamp, and the tapering, or conical form of said guide $g$ allows the parts to be placed over the wick-tube with great facility, and it is impossible for the same, and the parts connected with it, to be misplaced.

The draught-plate $h$ is of a size to set freely within the chimney $f$, and the said draught-plate $h$ is supported by the metallic strips, or connections $k$, that extend from it to the guide $g$, or to the air-distributer $e$.

Around the periphery of this draught-plate $h$, I form a range of small holes, and thread thereinto the expansive helical spring $m$.

This is effected by revolving the spring, and having been wound with its coils rather further apart than the distance between said holes, the spring becomes an expansive interior clamp to the chimney, which is forced over it with great ease, but is securely held by that and the edge of the air-distributer $e$.

It will now be understood that the lower part of the chimney $f$ and air-distributer $e$ being so far removed from the flame, are but little heated, and can be removed entirely from the lamp, to give access for trimming or lighting the wick, or for taking a light therefrom while the lamp is burning.

The screw $b$, and its cylindrical upper portion $l$, form a closed cap to the wick-raiser, and also receive the perforated air-distributer and the base of the tapering wick-tube guide.

The wick-tube and reservoir are kept cool by the draught that passes through the air-distributer, and danger from escaping vapors is prevented by the closed cap $b\ l$.

The air-distributer becomes a base that sustains the draught-plate, chimney-holder, and chimney in an upright position, when removed from the burner.

What I claim, and desire to secure by Letters Patent, is—

1. A perforated air-distributer, sustained around the wick-tube by the closed cap, containing the wick-raiser, but removable therefrom, in combination with a draught-plate, connected with said air-distributer, and passing up into the glass chimney, substantially as and for the purposes set forth.

2. A draught-plate, supported within the chimney and above the wick-tube, and a chimney-holder, made removable from the burner, in combination with the wick-tube and a closed ratchet-cap, upon which the movable parts are supported, substantially as set forth.

3. The chimney-holder, made removable, with the draught-plate, that is supported within the chimney, in combination with an internal spring, or springs, to clamp the chimney, substantially as specified.

4. The closed cap around the wick-tube and over the wick-raiser, in combination with the removable air-distributer, supported by said cap, and with a spring chimney-holder, substantially as specified.

In witness whereof, I have hereunto set my signature, this 13th day of February, A. D. 1868.

L. J. ATWOOD.

Witnesses:
JAS. M. ABBOTT,
JOSIAH McWHINNIE.